US011276237B2

(12) United States Patent
Sergott et al.

(10) Patent No.: US 11,276,237 B2
(45) Date of Patent: Mar. 15, 2022

(54) AUGMENTED REALITY CAMPUS ASSISTANT

(71) Applicant: PRO Unlimited Global Solutions, Inc., Folsom, CA (US)

(72) Inventors: Ted Sergott, Moraga, CA (US); Brad Martin, Jacksonville, FL (US)

(73) Assignee: PRO UNLIMITED GLOBAL SOLUTIONS, INC., San Francisco, CA (US)

( * ) Notice: Subject to any disclaimer, the term of this patent is extended or adjusted under 35 U.S.C. 154(b) by 0 days.

(21) Appl. No.: 16/950,776

(22) Filed: Nov. 17, 2020

(65) Prior Publication Data

US 2021/0065453 A1 Mar. 4, 2021

Related U.S. Application Data

(63) Continuation of application No. 16/382,122, filed on Apr. 11, 2019, now Pat. No. 10,846,935.

(60) Provisional application No. 62/656,885, filed on Apr. 12, 2018.

(51) Int. Cl.
*G06T 19/00* (2011.01)
*H04W 4/029* (2018.01)
*H04W 4/02* (2018.01)

(52) U.S. Cl.
CPC ............ *G06T 19/006* (2013.01); *H04W 4/025* (2013.01); *H04W 4/029* (2018.02)

(58) Field of Classification Search
None
See application file for complete search history.

(56) References Cited

U.S. PATENT DOCUMENTS

| 8,509,488 | B1* | 8/2013 | Enge ................. | G01C 21/3623 |
| | | | | 382/106 |
| 9,235,913 | B2* | 1/2016 | Blanchflower ......... | G06F 3/011 |
| 10,467,230 | B2* | 11/2019 | Alphin, III ......... | G06Q 10/0639 |
| 2009/0010496 | A1* | 1/2009 | Saito ................... | G06K 9/3216 |
| | | | | 382/106 |
| 2011/0032109 | A1* | 2/2011 | Fox .................... | H04N 21/4113 |
| | | | | 340/628 |
| 2013/0083066 | A1* | 4/2013 | Aoki ................. | H04M 1/72427 |
| | | | | 345/633 |
| 2016/0267808 | A1* | 9/2016 | Agostini ................. | G09B 7/08 |

* cited by examiner

*Primary Examiner* — Tapas Mazumder
(74) *Attorney, Agent, or Firm* — Temmerman Law; Mathew J. Temmerman

(57) ABSTRACT

This invention relates to information processing systems and methods in a workplace environment. More particularly, the invention relates to systems and methods for displaying information for use by human users in a workplace environment. Such methods and systems may include an augmented reality mobile device application with voice interactive and other features including user-selectable buttons. Such methods and systems provide rich real-time information to the user via composited media content, overlay imagery, and acoustic speakers. Composited media content may include interactive maps, calendaring functions, navigation information, and tools to assist with management of assignment information. The augmented reality methods and systems facilitate access to various locations and resources at given workplace campus.

20 Claims, 3 Drawing Sheets

AUGMENTED REALITY CAMPUS ASSISTANT

RELATED APPLICATIONS

This application is a continuation application of U.S. Nonprovisional application Ser. No. 16/382,122, filed Apr. 11, 2019 and granted on Nov. 24, 2020 as U.S. Pat. No. 10,846,935, and which claims priority from U.S. Provisional Application with Ser. No. 62/656,885 filed on Apr. 12, 2018.

FIELD OF THE INVENTION

This invention relates to information processing systems and methods in a workplace environment. More particularly, the invention relates to systems and methods for displaying information for use by human users in a workplace environment. These systems and methods may include an augmented reality mobile device application with voice interactive and other functions including user-selectable buttons.

BACKGROUND

The present invention relates to methods, systems and data transmitted from intelligent networked mobile computer systems operating in an electronic environment that may be referred to as the "Internet of Things". The "Internet of Things" describes the increasing levels of electronic interconnectedness, computing power and autonomy of behavior featured in everyday devices. Devices utilized in the workplace are more commonly called "intelligent" or "smart", reflecting built-in computational abilities that allow them to control their own behavior in response to environmental changes as well as (or instead of) user controls. In a workplace environment, such devices typically log relatively large amounts of data, and transmit that data to other places for processing such as mobile computer systems or external computer systems.

An increasing number of employees today in mobile workplace environments are assisted by smart hand-held and/or smart mobile computer systems. Rather than using computer kiosks or workstations at locations throughout the work environment, smart mobile computers allow the employee to move freely about the workspace and retrieve information from computer networks accessible at their fingertips. Examples of these include retail operations where sales assistants or inventory control clerks carry hand-held computers with barcode scanners that can identify products by scanning the barcode and then displaying information associated with that product. Another example includes car rental return agents who key information into a smart mobile computer in the parking lot of the rental agency when the car is returned, and then print out a receipt from a mobile printer.

While these systems are useful, they have limited capabilities. Hand-held computers require the employee to devote one or both hands to the task of manually typing out commands into a keyboard associated with the computer. Such computers also generally require the employee to focus his gaze and attention to the hand-held computer rather than on the external environment and/or task before him. While these solutions represent an advance over stationary kiosks and strategically located catalogs, there is still much room for improvement to free up the hands and attention of the employee, to thereby increase the employee's productivity.

Current and predicted examples of "intelligent" and interconnected devices include: medical monitoring equipment in the home that receives data from medical devices, biological sensors and/or implants; wrist-worn activity trackers with the ability to transfer logged health data to a user's computer, and to the manufacturer's servers for analysis; the whole category of "wearable computing" including clothing made of "smart fabrics" with built-in sensors for health, sports and/or safety and the ability to alter their fabric's properties in response to feedback, as well as "smart watches" with built-in computers and Bluetooth connectivity. "Smart" appliances are rapidly emerging including enhanced functionalities such as augmented reality features. For example, augmented reality eye mobile devices exist, including "Google Glass", which is reportedly able to continuously monitor the user's surroundings by video, apply face recognition, and provide real-time information to the user.

Modern computing and display technologies have facilitated the development of systems for so called such "augmented reality" experiences, wherein digitally reproduced images or portions thereof are presented to a user in a manner wherein they seem to be, or may be perceived as, real. An augmented reality, or "AR", scenario typically involves presentation of digital or virtual image information as an augmentation to visualization of the actual world around the user. For example, an augmented reality scene may allow a user of AR technology to see one or more virtual icons superimposed on or amidst real world images.

Notably, portable electronics and/or mobile phone devices now generally include a large variety of sensing capabilities. These capabilities can be utilized to further enhance a user's augmented reality experiences.

SUMMARY OF THE DISCLOSURE

To minimize the limitations found in the existing systems and methods, and to minimize other limitations that will be apparent upon the reading of this specification, the preferred embodiment of the present invention provides a method for providing augmented reality information to a user in real time.

The present invention is directed to systems and methods of providing an augmented reality experience to a user working on and navigating around a workplace campus. The present invention addresses several problems that persists in the field: that employees and staff are overwhelmed with data and tasks and thus cannot carefully parse the data related to their job in a timely fashion. In addition, human resources personnel, employees, staff and building management personnel are often overwhelmed with information and tasks that may be easily automated with software and hardware systems. Further, tasks such as navigating around a given workplace campus are often difficult for new hires, for employees of very large companies, and for temporary employees who make lateral career moves with great frequency. In addition, traditional key and lock systems are difficult expensive to change, particularly in industries with high employee turnover. Difficulty managing building access also poses a threat to building security.

Each of these issues may be facilitated by augmented reality methods and systems with voice interactive and augmented reality functions including user-selectable buttons. Such methods and systems may be able to utilize facial recognition and provide rich real-time information to the user via composited media and acoustic speakers. Composited media may include interactive maps, calendaring functions, building access means, and tools to assist with management of assignment information. Utilizing these features, an augmented reality environment may facilitate access to various locations and resources on a given workplace campus. In addition, augmented reality methods and systems may offer improved security and a variety of cost-saving features.

A first objective of the present invention is to provide a means to enhance efficiencies for job seekers, hiring managers, workplace visitors, employees, staff, and the like.

A second objective of the present invention is to provide a means by which employees can attend to their duties and interact with smart devices without having to manually type out commands into a keyboard.

A third objective of the present invention is to provide a means of focusing employee attention on the environment around him or her and the task at hand, rather than on a hand-held or wearable device that assists the employee in his or her duties.

A fourth objective of the present invention is to provide a trigger image or logo-controlled means of facilitating navigation around a workplace campus and a trigger image-controlled means of viewing and interacting with additional active information.

A fifth objective of the present invention is to provide a means of providing employees with real-time information related to their assignments.

A sixth objective of the present invention is to provide a means for employees and management to track assignment progress, and assignment histories in real time.

Still another objective of the present invention is to provide a logo-controlled and/or biometrically-controlled means of accessing a building or a door within a building.

These and other advantages and features of the present invention are described with specificity so as to make the present invention understandable to one of ordinary skill in the art. In addition, these and other features, aspects, and advantages of the present invention will become better understood with reference to the following description.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention. Thus, the drawings are generalized in form in the interest of clarity and conciseness.

DETAILED DESCRIPTION

Figure 1:
FIG. 1 shows a specific logo scanned thereby initiating an augmented reality experience according to an embodiment.

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized, and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term "about" means +/−5% of the recited parameter. All embodiments of any aspect of the invention can be used in combination, unless the context clearly dictates otherwise.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

This present invention comprises information processing systems and methods in a workplace environment. A workplace environment comprises a workplace campus, workplace interior, locations external to a workplace campus, and other locations associated with a workplace. More particularly, the invention relates to systems and methods for displaying active information for use by human users in a workplace environment. Active information may include information required by employees in the workplace, including user navigation history information, local user building access history information, user remote building access history information, user button selection history information, voice command history information, user calendar history information, user assignment history information, user current assignment information, user timecard history information, user video history information, and the like. Notably, local user building access history and user remote building access history refer to the recordation of building door locking and unlocking histories of a given user, and differ only in the physical location of the user when a building door was accessed. Talent Network history information refers to a user's history of selecting, investigating, or interviewing for a position identified via the Talent Network functionality of the present invention.

A mobile device may be a wireless mobile device or any type of portable computer device, including a cellular telephone, a Personal Digital Assistant (PDA), smartphone, etc. By way of example only, and not by way of limitation, smartphones contemplated by the present invention include Apple's iPhone series, Google's Droid and Nexus One series, Palm's Pre series, and RIM's Blackberry series of smartphones. Most, if not all, of these mobile devices include a built-in camera that can be controlled by software applications. In some embodiments, mobile devices comprise a camera, a processor, a graphical user interface (GUI), and a memory. In embodiments, the memory is operatively coupled to the processor and stores program instructions that when executed by the processor, causes the processor to receive an image from the camera. Said image may be displayed on the GUI. The GUI may also receive descriptive data for the image and store the descriptive data and image as a listing. Generally, said listing may be transmitted wirelessly to a host server.

As discussed, the present augmented reality mobile device application may facilitate employment activities such as navigation, accounting, networking, and the like. To this end, the mobile device may comprise a display, a GPS module, a compass, a camera and various other input/output (I/O) components. In the preferred embodiment, the mobile device is capable of capturing media content such as general workplace imagery, badge imagery, logo imagery, sound information, location information, and/or similar media content external to a workplace environment. The mobile device or smartphone contemplated by the present invention is also capable of superimposing overlay imagery onto the captured media content.

As described above, in some embodiments the present invention comprises an information processing system in a workplace environment. In one embodiment, said information processing system may be summarized as a system comprising a server connected to a network, wherein the server receives requests from users via a network. This server may include a processor(s), a database for storing trigger image information, and a memory operatively coupled to the processor. In some embodiments of the present invention, memory stores program instructions that when executed by the processor, causes the processor to receive media content requests such as a trigger image from a user via the network. Overlay imagery is generated from the trigger image database based on such a request. Finally, overlay imagery and/or composited media content is transmitted to the user via the network.

As described above, the present invention also comprises information processing methods in a workplace environment. In some embodiments, said information processing methods involve the following steps: 1) media content is captured at a workplace with a camera of a mobile device of a user (i.e., a trigger image in the workplace), 2) the trigger image is decoded to determine a location and a position of the mobile device, 3) trigger image is identified based on the location and the direction of the mobile device, 4) the user capturing the trigger image is identified, 5) overlay imagery is downloaded into the mobile device from a server, 6) overlay imagery is overlaid onto the captured media content (i.e., an object, logo, badge, etc.) to create a composited media content, and 7) the composited media content is displayed on the mobile device. The composited media content represents, in essence, the augmented reality experience of the user.

Regarding step two described above, in some embodiments determining the location and position of the mobile device may utilize a global positioning system module (also referred to herein as "GPS") in the mobile device. In another embodiment, determining the location and position of the mobile device may utilize a cellular infrastructure to triangulate the location of the mobile device.

Regarding step three described above, in one embodiment, identifying the trigger image may further involve an analysis of a trigger image database. The trigger image database includes various information including lists of trigger images, information regarding the workplace campus, structural aspects of the workplace environment, user access information, user past history information, and the like. In another embodiment, identifying the trigger image may further involve transmitting the location and the direction of the trigger image to the server and thereafter receiving an identification of the trigger image from the server.

Regarding step four described above, identifying the workplace user may further involve analyzing the workplace user based on an identification of the trigger image and/or user assignment history information. In another embodiment, identifying the workplace user may further involve extracting an image from media content comprising a trigger image and locating a distinctive feature in the trigger image.

As described above, overlay imagery may be derived from workplace activities of users. Workplace activities may comprise current activities of several users, current activities of a single user, past workplace activities of several users, past workplace activities of a single user, and the like. Past workplace activities of a single user may include past navigation routes taken by a user, voice commands made by a user, assignment information related to a user, a user's expense history, and the like. Further, overlay imagery may include text, icons, graphics, still images, motion video, augmented reality screens or any combination thereof. The overlay imagery may also comprise a interface (i.e., Graphical User Interface) to which the user can input data (i.e., voice information, location information, etc.).

When the captured media content and overlay imagery are combined composited media is created, thereby providing in an augmented reality experience for a user. In embodiments, the present invention further comprises a backend server that may include any number of servers (i.e., workplace server, account server, etc.). In some example embodiments, backend servers can retrieve the user's past workplace activities from a user tracking account provided by the workplace or a user account provided by a manufacturer of the one or more trigger images. Such an account can be a workplace-based account and/or an online account for the user. In the preferred embodiment, the mobile device of the present invention may communicate with such a server.

As described, the present invention comprises a mobile device including a camera capable of capturing media content. In the preferred embodiment, the user initiates an augmented reality experience by capturing media content comprising a trigger image (also referred to herein as a "trigger"). A trigger image may comprise various media content including an object, image, video or similar media content. Identifying the trigger image comprises transmitting the captured trigger image to a server. The server then identifies the trigger image based on media content transmitted to and stored in the server. As discussed, media content such as overlay imagery may derive from past workplace activities of the user of the mobile device.

Figure 4:
FIG. 4 shows an augmented reality system integrating campus routes and travel time according to an embodiment.

In one embodiment, as shown in FIG. 1, a trigger image may comprise a Wand Campus App Logo that is scanned to begin an augmented reality experience. Rather than relying on capturing media content to initiate an augmented reality experience, a user may also directly input requests into the augmented reality program. Such requests may be auditory, typed manually, etc. and may relate to any of the functionalities described herein, including calendaring, assignment management, managing job opportunities, and the like. Available content chosen by a user may be restricted or limited to a particular theme or category. For example, as shown in FIG. 4, a user may restrict choices to those related to navigation information. In this way, an employee can call up overlay imagery restricted to specific categories of information by specifying particular input information.

When a user provides input information to the augmented reality program, this information is transmitted to a workplace management system (also referred to herein as "WMS") that identifies information relevant to the chosen content. WMS makes a determination based on the input information and then outputs composited media content to an output of the mobile device. For example, a user may restrict choices to those related to navigation information, thereby transmitting to WMS a navigation request and eliciting a determination related to the location, travel direction, travel speed, etc. of the user. An overlay module then outputs visual composited media content comprising, for example, a 3D campus map to the display and audible composited media content to the speaker.

The present invention provides various means for a user to input information, including voice interactive functions and user-selectable buttons. In addition, as described above, the present invention allows a user to view and manipulate active information. Active information may include information required by employees in the workplace, including user navigation history information, user maps integration history information, user building access history information, user remote building access history information, voice command history information, user calendar history information, user assignment history information, user timecard history information, user button selection history information, user video history information, and the like. Utilizing these features, the augmented reality environment facilitates access to various locations and resources on a given workplace campus. Notably, user video history information refers to the history of videos viewed by the user.

Figure 3:
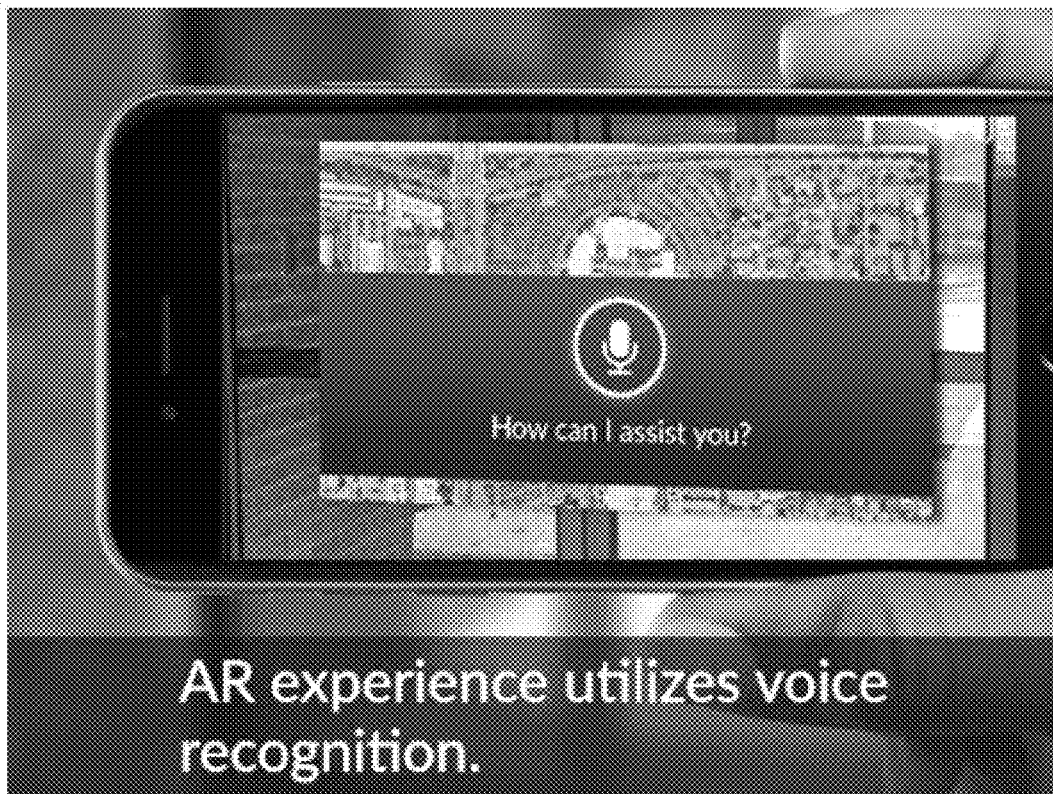
FIG. 3 shows an augmented reality system utilizing voice recognition according to an embodiment.

As discussed above, the user provides input information in any of the manners or modes described herein, including voice commands and user-selectable buttons. Regarding voice command and voice recognition functionalities, the user may call up a desired program or application by voice recognition. As shown in FIG. 3, when the augmented reality program recognizes the user's voice, composited media content may be displayed on the augmented reality mobile device screen. For example, composited media content may present the user with questions such as, "How can I assist you?", in response to voice recognition by the augmented reality mobile device.

In some embodiments, the user may control the mobile device by indicating a choice on the virtual screen. Alternatively, the mobile device may be responsive to one or more motion or position sensors mounted on the electronic building, exterior structures, interior structures, or on the mobile device itself. Regardless of the form of user input, the signals generated by the user inputs are initially sent to a microprocessor or microcontroller within the mobile device itself. Then, the mobile device provides signal transducing and/or processing steps either at a remote server or locally in the mobile device. For example, some of the processing can occur at the remote server, while the remaining processing can occur at the mobile device.

In one embodiment exemplifying the voice command functionality of the present invention, the user simply vocalizes "yes" or "no" in order to activate or deny the display of information. Further to the above, overlay imagery may be activated by questions asked by the user. For example, a user may ask, "What buildings do I have access to?" A variety of additional input means are contemplated by the present invention. For example, in another embodiment, the user provides a hand gesture to indicate "yes" or "no". In yet another embodiment, a trackpad depression may indicate "yes" or "no". Such commands may trigger a variety of programs in the augmented reality system.

In the preferred embodiment of the invention, user-selectable buttons provide yet another means for a user to input information into the augmented reality system. Buttons are presented as overlay imagery and may display active information. As described above, active information may include information required by employees in the workplace, including user navigation history information, building access history information, user remote building access history information, voice command history information, user calendar history information, user assignment history information, user timecard history information, user video history information, and the like. Utilizing these features, the augmented reality environment facilitates access to various locations and resources on a given campus. In some embodiments, after the scanning of a trigger image, buttons are presented to the user's mobile device as augmented reality screens or icons. In general, buttons are presented to the user when the display of media content such as a building, trigger image or other object is roughly centered in the camera view. In some embodiments, image analysis algorithms built into a capture module automate the activation of programs otherwise controlled by buttons. Such capture modules detect the presence of trigger images in the camera view and immediately begin capturing images and user information. Regarding said automated image analysis, the presence of a trigger image or a physical barcode sticker may also be used to automatically begin capturing media content.

In one embodiment, a Logo App utilizes trigger images comprising workplace logos (i.e., the Wand Campus App logo shown in FIG. 1). In this embodiment, following the identification of the logo trigger image and the identification of the proper overlay imagery, the final composited media content is assembled on augmented reality screens surrounding the logo (as opposed superimposing composited media content on the logo itself). Active information may include information required by employees in the workplace, including user navigation history information, building access history information, user remote building access history information, voice command history information, user calendar history information, user assignment history information, user timecard history information, user video history information, and the like.

Figure 2:
FIG. 2 shows an augmented reality system providing building information according to an embodiment.

In some embodiments, the Logo App interfaces with mapping and travel time functionalities of the augmented reality system. Regarding mapping functionalities, maps integration serves to assist navigation around a workplace campus. This functionality further serves to improve meeting management, security, building access, campus rendezvous with visitors, and the like. In the preferred embodiment of the mapping functionality, the mobile device provides 3D composited media campus maps for a user. Said mapping composited media may be accompanied by voice information, video information, and the like. Further, the mapping overlay imagery may include text, pictures, buttons, or any combination thereof. As described above, voice command features and user-selectable features such as buttons allow a user to input navigation information into the augmented reality program. For example, in some embodiments the user may input mapping information into the augmented reality program related to his or her desired destination and destination arrival time.

the preferred embodiment, the user's mobile device screen provides the primary means by which a user views and interacts with the augmented reality mapping program. As with the other invention functionalities described herein, in order to utilize the mapping functionality, the user first scans a trigger image (i.e., the Human Resources Building). After scanning a trigger image, the forward-facing camera of the mobile device takes an image of the trigger image and sends it for processing to the mobile device's processor. In some embodiments, trigger image recognition software then determines which building or trigger image a user is facing. Alternatively, GPS coordinates may be searched in a database to determine what building or trigger image a user is facing. As shown in FIG. 2, information such as building information in the vicinity of the trigger image may then be displayed to the user's mobile device screen. In the preferred embodiment, following the identification of the trigger image and the identification of the proper overlay imagery by the mobile device, composited media content with mapping details is superimposed onto a user's screen in order to assist the user in completing various navigation activities.

Figure 5:
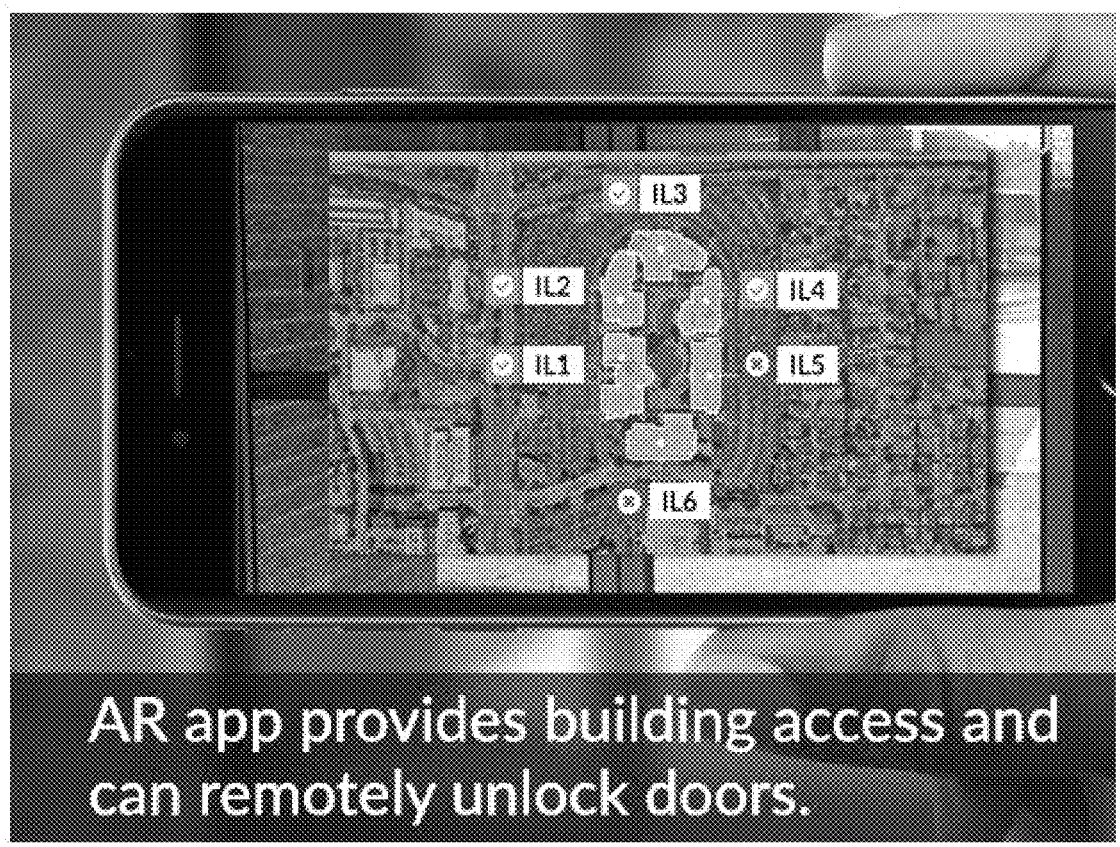
FIG. 5 shows an augmented reality system providing building access and remotely unlocking doors according to an embodiment.

In one example of the mapping functionality, composited media content assists a new employee visiting the Reception Building on his or her first day. When approaching the building, the new employee may scan a trigger image located at the Reception Building entrance in order to initiate mapping assistance. As shown in FIG. 1, said trigger image may comprise a logo imprinted on the glass door of the Reception Building front entrance. To call up composited media information, the user may hover over a Wand Campus App logo located at the front door, thereby causing the augmented reality application to present various augmented reality screens surrounding the logo on the mobile screen. This information may include campus maps, calendar information, expense information, assignment information, job opportunity information, building information, building access tools and the like as described herein. As shown in FIG. 5, building access tools may comprise user-selectable icons enabling locking and unlocking of various doors, both in person and remotely.

In some embodiments, the mapping functionality provides composited media related to workplace events on campus, meeting locations, meeting times, campus routes, travel times, building information, and the like. FIG. 4 shows how maps integration may facilitate display of such information, including campus routes and travel times. Furthermore, in some embodiments campus route information may comprise cookie crumbs that illuminate a pathway across the campus leading to a given building. In other embodiments, the mapping functionalities of the present invention may utilize mobile GPS hardware and may interface with calendaring functions provided by the augmented reality system.

As mentioned above, in the preferred embodiment of the present invention, building access features are also provided. When composited media and overlay imagery comprise building access information, images or icons summarizing building entry details are provided. Such building entry icons are user-selectable and may be utilized on location or remotely. Further, building access features may include trigger image-controlled and/or biometrically-controlled door locks. Similar to the mapping features described above, the user's mobile device initiates use of building access features by first capturing media content (i.e., a still image or motion video) of a trigger image. A trigger image may comprise a workplace door, door icon, badge, logo, and the like. The mobile device then superimposes composite media content surrounding the trigger image (i.e.; a logo) in order to form a composited media image. Corresponding with the appearance of composited media, the augmented reality program asks if the user would like access to the building, or alternately a door within the interior of the building. In some embodiments, as shown in FIG. 5 the augmented reality program presents color-coded selectable icons to represent locked and unlocked doors and may allow a user to remotely unlock doors. As shown in FIG. 5, in some embodiments, unlocked doors are identified with alphanumeric and color codes. The composited media is selectable to lock and unlock doors, either in person or remotely, and may be accompanied by audio information.

The overlay imagery comprising the building access functionality may include text, pictures, buttons, video, or any combination thereof. In one embodiment, when the user pushes the yes button on the mobile device, the system unlocks the door. This user command may be combined with biometrically-controlled information, such as a photograph of the user's face. The user command and/or biometric information is then transmitted to the WMS, which then identifies the user as being authorized. Following authorization of the user, a message is automatically sent to the relevant electronic building location to unlock the door. In one embodiment, the building has a solenoid attached to the door lock, and unlocks the door under software control. Notably, the building access features of the present invention may be linked to the calendaring, timecard, and other features of the invention that are herein disclosed. For example, in one embodiment, when accessing an assigned building, an employee's time on the job is automatically tracked. Relatedly, when an employee leaves the building, time tracking may stop.

The advantage of such trigger image-controlled and/or biometrically-controlled systems is that they remove the need for a workplace to issue master keys to users. In addition, traditional key and lock systems are difficult to change. Moreover, the disclosed augmented reality system offers better security than either existing key or biometric systems. Additionally, trigger image-controlled door locks are inexpensive to deploy, requiring only a software-controlled solenoid to be installed in each building.

Regarding the calendaring and timecard functionalities of the present invention, the present invention can be used to display real-time information to users regarding their daily schedules in addition to information about past activities. In some embodiments, the mobile device superimposes composited media onto augmented reality screens surrounding the captured trigger image, as described above. Calendaring information may include project start and end dates and may also include a countdown providing the number of days remaining to complete a given project. The computing platform of the augmented reality system described herein also includes calendaring inputs that maintain user context information such as user preferences, user calendar history information, meeting durations, meeting outcomes, etc. In some embodiments, the calendar functionality may provide a proxy for user preferences and user context by enabling preferences to be inferred from prior actions and the user's calendar, which indicates user context like time, place, related contact information and subject descriptor.

As shown in FIG. 4, timecard functionalities are also available to the user of the present augmented reality system. For example, in some embodiments the augmented reality application displays daily working hours that may be tracked and compared on a weekly basis, in addition to a time entry breakdown showing approved time, time pending approval, and overtime hours. In some example embodiments, a backend server can retrieve the user's workplace timecard activity from a user tracking account maintained by the workplace. Such an account can be a workplace-based account and/or an online account for the user.

Regarding the assignment information functionality of the present invention, the present augmented reality system can be used to display real-time information identifying key assignment contacts, skills required for a given position, and the like. In the preferred embodiment, the mobile device superimposes composited media content onto augmented reality screens surrounding the captured trigger image. Assignment information may include information related to assignment contacts including photographs, positions in the company, employee ID information, barcodes linked to employee information, and the like. Further, assignment completion status may be displayed as a color-coded image and a displayed percentage. In addition, in a feature of high relevance to both managers and employees, a color-coded user-selectable list of required position skills may be listed. Required position skills may include proficiency with software (i.e.; Microsoft Office), leadership experience, budgeting experience, reporting experience, risk management experience, analytics experience, and the like. Buttons may be presented to a user that permit the presentation of assignment details, timecard information, and the like.

Additional features of the present invention include the use of a user's mobile device to view videos, such as training videos and navigation videos, that are viewable by clicking on video icons presented to the user. In various embodiments, videos are identified via search by GPS location, search by trigger image recognition, search by vocal command, search by gesture command, and the like. Continuing with the example of the Human Resources Building, a video database may be searched via the GPS coordinates of the Human Resources Building or by keystroke user input of the term "Human Resources Building". Search results may include geo-tagged training videos for training of Human Resources personnel, navigation assistance to the Human Resources Building, and/or videos associated with maintenance of the Human Resources Building.

The videos may be scrolled or flipped through using the control techniques described herein. Videos of interest may be played using the control techniques described herein. The video may take the form of composited media overlaid onto a real world scene or may be superimposed on the trigger image itself as described above. In embodiments, the mobile device may also be darkened to enable higher contrast viewing. In another embodiment, the mobile device may be able to utilize camera and network connectivity to provide the user with streaming video conferencing capabilities.

As noted, users of the present augmented reality system may receive content from an abundance of sources and may limit their choice of composited media to particular themes or categories. In some embodiments, a user may limit composited media to only one department or building or within certain geographical limits. In one embodiment, these limits are selected via GPS criteria or by manually indicating a geographic restriction. In another embodiment, a user may require that sources of streaming content be limited to those within a certain radius (a set number or km or miles) of the user. These limits may be set by voice command, button selection, hand motion, or any other mode of user input described herein.

Example Operations

FIG. 6 is a flowchart of operations for the augmented reality system in a workplace environment according to some example embodiments. A flow diagram 10 includes operations that, in some example embodiments, are performed by components of a mobile device. The operations of the flow diagram 10 begin at block 12.

The camera of the mobile device captures media content of a trigger image that is local or remote to a workplace environment. For example, the camera of the mobile device can capture still images, video, or a combination thereof. Examples of triggers being captured at a workplace environment include a badge, a logo, a building, icon etc. as described above. Examples of triggers being captured outside workplace environments include signage at an establishment outside of the workplace campus yet owned by or associated with the workplace (i.e., brick-and-mortar restaurants, stores, etc. associated with the workplace). As described above, trigger images may be captured by various users of the augmented reality system. Users may include employees, management, visitors, maintenance workers, security workers, and the like.

A GPS module or cellular infrastructure is used to determine a location of the mobile device at a time when the media content is captured by the camera. The GPS module, for example, receives signals from a number of satellites orbiting around the Earth. The signals include data that indicates the satellite position and current time. Based on the satellite position and time when signals were sent from multiple satellites, the GPS module can use trilateration to determine its location on the Earth. In some example embodiments, differential GPS is used, wherein the area has already been surveyed using a GPS. The GPS module could determine the location of the mobile device within that area. The overlay module can then adjust the location captured by the GPS module with the location data from the previous survey. As noted above, the location can be determined using a cellular infrastructure to triangulate the location of the mobile device, alternatively or in addition to GPS locating. The overlay module of the mobile device stores this location in the storage unit of the mobile device for subsequent processing.

The compass of the mobile device determines a direction that a lens of the camera of the mobile device is facing at a time when the media content is captured by the camera. The overlay module stores this direction in the storage unit and/or main memory for subsequent processing. Alternatively, or in addition to determining the position and location of the mobile device using GPS and a compass, the overlay module can make this determination based on embedded trigger images, such as logos, badges, and the like in various workplace displays (as described above).

The overlay module identifies the trigger(s) based on the location of the mobile device and the direction that the lens of the camera is facing at the time when the media content is captured by the camera. The overlay module can determine the location of triggers in view of the lens of the camera based on the location of the mobile device and the direction of the lens. In some example embodiments, the overlay module can transmit its location and direction to a backend server. The backend server can then return the identification of the viewable triggers to the overlay module. In particular, the backend server stores the location of triggers in the area (i.e., workplace environment). For example, the locations of the triggers, structural aspects of the workplace environment (i.e., structural posts, walls, etc.), etc. are stored by the backend server. Accordingly, the backend server can return the identification of the triggers in the viewable area. In some embodiments, identifying a workplace user involves an analysis of a trigger image database. The trigger image database includes trigger image information. Trigger image information may include a list of trigger images, information regarding the workplace environment, the locations of the triggers, structural aspects of the workplace environment, user access information, user past history information, and the like.

The overlay module downloads, into the mobile device from a backend server, overlay imagery derived from workplace activity. Various overlay imagery can be downloaded (as described above). For example, if the captured image comprises a trigger image, the overlay imagery may include data regarding past workplace activity for the particular trigger image. The overlay imagery can also identify other similar types of programs to execute based on the specific trigger image. In another example, the overlay imagery can provide media content related to a past workplace activity of the user associated with the mobile device. For instance, the past workplace activity of the user may comprise past campus navigation routes, past assignment information, past interviews, past meetings, etc.

The overlay module composites the overlay imagery onto the captured media content to create a composited media content. The composited media content can be various combinations of media content. For example, a still imagery (i.e., text, graphics, etc.) can be composited onto a video or a still image. In another example, video imagery can be composited onto a video or still image. In another example, a graphical user interface can be composited onto a video or still image to allow the user to enter information. While the media content has been described relative to visual media content, in some other embodiments, audio media content can be included as either or both the captured media content or part of the overlay imagery.

The overlay module outputs the overlaid media content to an output of the mobile device. For example, the overlay module can output the visual overlaid media content to the display and audible overlaid media content to the speaker. Alternatively, or in addition, the overlay module can output the overlaid media content to other devices. This output can occur through a wired or wireless communications between the mobile device and the other device.

As described above, the present invention relates to information processing methods and systems in a workplace environment. Said systems may include an augmented reality mobile device system with voice interactive and other augmented reality functions including user-selectable buttons. Said system can take the form of an entirely hardware embodiment, an entirely software embodiment or an embodiment containing both hardware and software elements. In one embodiment, the system is implemented in software, which includes but is not limited to firmware, resident software, microcode, etc.

Furthermore, the system can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium comprise a semiconductor or solid-state memory, magnetic tape, a removable computer diskette, a random-access memory (RAM), a read-only memory (ROM), a rigid magnetic disk and an optical disk. Current examples of optical disks comprise compact disk-read only memory (CD-ROM), compact disk-read/write (CD-R/W) and DVD.

A data processing system suitable for storing and/or executing program code comprises at least one processor coupled directly or indirectly to memory elements through a system bus. The memory elements can include local memory employed during actual execution of the program code, bulk storage, and cache memories that provide temporary storage of at least some program code in order to reduce the number of times code is retrieved from bulk storage during execution Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Described above, aspects of the present application are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. The internet 20 can include a plurality of local area networks ("LANs") and a wide area network ("WAN") that are interconnected by routers. The routers are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art.

Furthermore, computers and other related electronic devices can be remotely connected to either the LANs or the WAN via a digital communications device, modem and temporary telephone, or a wireless link. It will be appreciated that the internet comprises a vast number of such interconnected networks, computers, and routers.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HTML, or other markup languages, that are electronically stored at or dynamically generated by "WWW sites" or "Web sites" throughout the Internet. Additionally, client-side software programs that communicate over the Web using the TCP/IP protocol are part of the WWW, such as JAVA® applets, instant messaging, e-mail, browser plug-ins, Macromedia Flash, chat and others. Other interactive hypertext environments may include proprietary environments such as those provided in America Online or other online service providers, as well as the "wireless Web" provided by various wireless networking providers, especially those in the cellular phone industry. It will be appreciated that the present application could apply in any such interactive communication environments, however, for purposes of discussion, the Web is used as an exemplary interactive hypertext environment with regard to the present application.

A web site is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a web site elsewhere on the Internet. Each hyperlink is assigned a URL that provides the name of the linked document on a server connected to the Internet. Thus, whenever a hypertext document is retrieved from any web server, the document is considered retrieved from the World Wide Web. Known to those skilled in the art, a web server may also include facilities for storing and transmitting application programs, such as application programs written in the JAVA.® programming language from Sun Microsystems, for execution on a remote computer. Likewise, a web server may also include facilities for executing scripts and other application programs on the web server itself.

A remote access user may retrieve hypertext documents from the World Wide Web via a web browser program. Upon request from the remote access user via the web browser, the web browser requests the desired hypertext document from the appropriate web server using the URL for the document and the hypertext transport protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the web server, such as JAVA applets, for execution on the client computer. Finally, the WWW browser may include optional software components, called plug-ins, that run specialized functionality within the browser.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

The invention claimed is:

1. An augmented reality system comprising:
   a. a mobile device having a display, a GPS module, a compass, a camera, input/output components, and an augmented reality application installed thereon;
   b. a server connected to a network, the server receiving requests from at least one user via the network, the server comprising:
      at least one processor;
      a database for storing at least one trigger image information; and
      a memory operatively coupled to the processor, the memory storing program instructions that when executed by the processor, cause the processor to:
         receive the at least one trigger image from the at least one user via the network;
         determine an overlay imagery about the at least one trigger image from the at least one trigger image database based on the request; and
         sends the overlay imagery to the at least one user via the network;
   c. whereby the augmented reality application facilitates the at least one user to access various locations and resources along with voice interactive and a user-selectable button functions thereby affording a real time information of the at least one user.

2. The augmented reality system of claim 1 wherein past activity of the at least one user is retrieved from an at least one user tracking account.

3. The augmented reality system of claim 1 wherein past activity of the at least one user is provided by at least one user account provided by a manufacturer of the at least one trigger image.

4. The augmented reality system of claim 1 wherein said trigger image information comprises identification data from a trigger image database.

5. The augmented reality system of claim 1 further comprising a server that receives said trigger images.

6. The augmented reality system of claim 1 wherein said display includes composited media content.

7. The augmented reality system of claim 6 wherein said composited media content includes said overlayed imagery.

8. A method for displaying active information of at least one user utilizing an augmented reality mobile device application installed on a processor of a mobile device with a memory in a database to provide secure access over a network, the method comprising the steps of:
   a. providing a mobile device having a display, a camera and an augmented reality mobile device application installed thereon;
   b. accessing the augmented reality mobile device application by a user, the augmented reality mobile device application having voice interactive and user-selectable button functions to generate a real time information of the at least one user;
   b. capturing media content of at least one trigger image with said camera;
   c. decoding the at least one trigger image to determine a location and a position of the mobile device when the media content was captured;
   d. identifying the at least one user-captured trigger image to determine a location and a direction associated with the mobile device;
   e. downloading to the mobile device an overlay imagery derived from a server;
   f. compositing the overlay imagery onto the media content to create composited media content; and
   g. displaying the composited media content on said display.

9. The method of claim 8, wherein a global positioning system module determines the location and position of the mobile device.

10. The method of claim 8, wherein past activity of the at least one user is retrieved from an at least one user tracking account.

11. The method of claim 8, wherein active information includes a local user building access history information.

12. A method for using a non-transitory computer readable storage medium containing computer readable instructions that control a processor of a server coupled with a memory in a database to display active information of at least one user in a workplace environment, the method comprising the steps of:
   a. providing a mobile device having a display, a camera and an augmented reality mobile device application installed thereon, the augmented reality mobile device application having voice interactive and user-selectable button functions to generate a real time information of the at least one user via a composited media content, an overlay imagery and a plurality of acoustic speakers;

b. capturing media content of at least one trigger image with said camera;
c. decoding the at least one trigger image to determine a location and a position of the mobile device when the media content is captured;
d. identifying the at least one user captured trigger image by means of transmitting the captured media content to a server and thereafter receiving an identification of the at least one trigger image from the server;
e. downloading to the mobile device the overlay imagery from the server;
f. overlaying the overlay imagery onto the media content to create a composited media content; and
g. displaying the composited media content on said display.

13. The method of claim 12, wherein identifying the trigger image comprises:
a. transmitting the captured media content to the server; and
b. receiving an identification of the trigger image from a trigger image database.

14. The method of claim 12, further comprising identifying the user based on an identification of the trigger image.

15. The method of claim 12, further comprising:
a. extracting an image from the media content of the trigger image;
b. locating a distinctive feature in the image; and
c. identifying the user based on the distinctive feature in the image.

16. The method of claim 12 wherein the overlay imagery is derived from a building access history data of the at least one user.

17. The method of claim 12 wherein the overlay imagery is derived from a user navigation history information of the at least one user.

18. The method of claim 12 wherein the overlay imagery is derived from a user voice command history information of the at least one user.

19. The method of claim 12 wherein the overlay imagery is derived from a user assignment history information or current assignment information of the at least one user.

20. The method of claim 12 wherein the overlay imagery is derived from a user button selection history information of the at least one user.

* * * * *